United States Patent
Matsumoto et al.

(10) Patent No.: US 10,403,172 B2
(45) Date of Patent: Sep. 3, 2019

(54) INFORMATION PROCESSING APPARATUS

(71) Applicant: HITACHI AUTOMOTIVE SYSTEMS, LTD., Ibaraki (JP)

(72) Inventors: Kohsei Matsumoto, Tokyo (JP); Kiyohiro Obara, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 147 days.

(21) Appl. No.: 15/534,345

(22) PCT Filed: Nov. 4, 2015

(86) PCT No.: PCT/JP2015/081007
§ 371 (c)(1),
(2) Date: Jun. 8, 2017

(87) PCT Pub. No.: WO2016/103921
PCT Pub. Date: Jun. 30, 2016

(65) Prior Publication Data
US 2017/0337849 A1    Nov. 23, 2017

(30) Foreign Application Priority Data

Dec. 26, 2014  (JP) ................................. 2014-264157

(51) Int. Cl.
*G01C 21/26* (2006.01)
*G01C 21/36* (2006.01)
*G09B 29/00* (2006.01)

(52) U.S. Cl.
CPC ........... *G09B 29/007* (2013.01); *G01C 21/26* (2013.01); *G01C 21/3626* (2013.01);
(Continued)

(58) Field of Classification Search
CPC .. G09B 29/007; G09B 29/00; G01C 21/3679; G01C 21/3626; G01C 21/3658; G01C 21/26
See application file for complete search history.

(56) References Cited

U.S. PATENT DOCUMENTS 4,882,696 A  * 11/1989 Nimura ................. G01C 21/36
                                                    701/437
2010/0082238 A1* 4/2010 Nakamura ............. G01C 21/32
                                                    701/532

(Continued)

FOREIGN PATENT DOCUMENTS

| JP | 2002-206929 A | 7/2002 |
| JP | 2005-164543 A | 6/2005 |

(Continued)

OTHER PUBLICATIONS

Partial Supplementary European Search Report dated Jul. 18, 2018 for the European Patent Application No. 15872490.6.

(Continued)

*Primary Examiner* — Thomas Ingram
(74) *Attorney, Agent, or Firm* — Volpe and Koenig, P.C.

(57) ABSTRACT

An information processing apparatus includes: a path planning unit that generates path data to a destination of a certain object; a filter setting unit that sets a filter representing an acquisition range to map data; and a map data acquisition unit that acquires, from the map data, data in a range set by the filter.

10 Claims, 11 Drawing Sheets

(52) U.S. Cl.
CPC ..... *G01C 21/3658* (2013.01); *G01C 21/3679* (2013.01); *G09B 29/00* (2013.01)

(56) References Cited

U.S. PATENT DOCUMENTS

| | | |
|---|---|---|
| 2011/0191285 A1 | 8/2011 | Sawai |
| 2012/0072113 A1* | 3/2012 | Kinoshita .......... G01C 21/3679 |
| | | 701/533 |
| 2016/0062955 A1* | 3/2016 | Maertens ................ H04W 4/20 |
| | | 715/202 |

FOREIGN PATENT DOCUMENTS

| | | |
|---|---|---|
| JP | 2007-309699 A | 11/2007 |
| JP | 2011-158339 A | 8/2011 |

OTHER PUBLICATIONS

International Search Report for WO 2016/103921 A1, dated Feb. 9, 2016.

* cited by examiner

INFORMATION PROCESSING APPARATUS

TECHNICAL FIELD

The present invention relates to an information processing apparatus that controls a reading range of map information.

BACKGROUND ART

To implement automatic operation or sophisticated operation support for a vehicle, it is necessary to read map information to an on-vehicle controller. PTL 1 discloses a device that controls the acquisition of map data on road regulations and the like according to a passing direction of a vehicle with respect to a regulation point set by a user.

CITATION LIST

Patent Literature

PTL 1: JP-A-2002-206929

SUMMARY OF INVENTION

Technical Problem

Necessary information in map information varies among various applications for vehicles for performing an automatic operation, an operation support, and the like. Further, necessary information in map information may vary depending on the situation of each vehicle.

In the control system, such as an on-vehicle controller, the capacity of information to be read may be limited. Accordingly, the control system is required to select necessary information in map data and reduce a load upon acquisition of the map information.

Accordingly, the present invention provides a technique for controlling a reading range of map information.

Solution to Problem

In order to solve the above-mentioned problem, for example, configurations described in the scope of claims are employed. The Present application includes a plurality of means to solve the above issue, and an example thereof is an information processing apparatus including: a path planning unit that generates path data to a destination of a certain object; a filter setting unit that sets a filter representing an acquisition range to map data; and a map data acquisition unit that acquires, from the map data, data in a range set by the filter.

According to another example, there is provided an information processing apparatus that receives sensor data from a sensor unit, the information processing apparatus including: a path planning unit that generates path data to a destination of a certain object; a filter setting unit that sets a filter representing an acquisition range to map data based on the path data and specification data of the sensor unit; and a map data acquisition unit that acquires, from the map data, data in a range set by the filter.

Advantageous Effects of Invention

According to the present invention, a range of information to be acquired from map information can be narrowed down. Further features related to the present invention will become apparent from the following description and the accompanying drawings. Problems to be solved, configurations, and advantageous effects other than those described above will become apparent from the following embodiments.

DESCRIPTION OF EMBODIMENTS

Embodiments of the present invention will be described below with reference to the accompanying drawings. Note that the accompanying drawings illustrate specific embodiments based on the principle of the present invention. However, these embodiments are illustrated for understanding of the present invention and thus the present invention should not be narrowly interpreted within the limits of such embodiments.

First Embodiment

Figure 1:
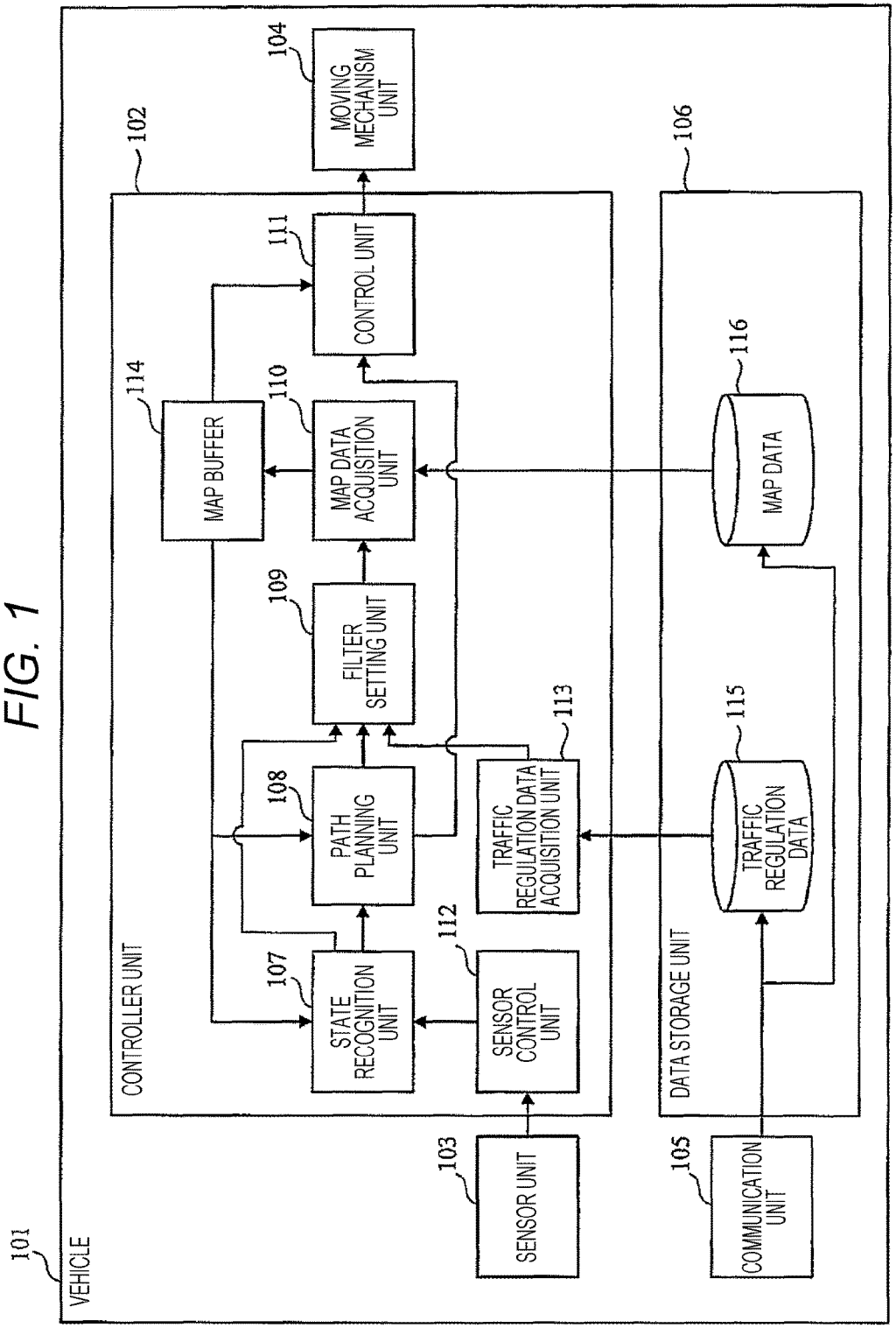
FIG. 1 is a schematic configuration diagram illustrating a vehicle according to a first embodiment.

A vehicle incorporating a controller that controls a reading range of a map is illustrated by way of example. FIG. 1 illustrates a configuration of a vehicle according to a first embodiment. A vehicle 101 includes a controller unit 102, a sensor unit 103, a moving mechanism unit 104, a communication unit 105, and a data storage unit 106.

In this case, the controller unit 102 is an information processing apparatus composed of a processor, a memory, and the like (not illustrated). The processor executes processing corresponding to each component of the controller unit 102, which is described later, in response to an instruction of a program stored in the memory. In other words, each component of the controller unit 102 can be implemented as software. Assume herein that each component in the controller unit 102 is implemented as software and the other parts are implemented as hardware. However, a part or the whole of the components in the controller unit 102 may be implemented as hardware.

The sensor unit 103 includes a stereo camera and a GPS. Accordingly, the sensor unit 103 has a function for measuring the position, posture, and circumference environment of the vehicle 101. Note that the sensor unit 103 may be composed of other sensors, such as a laser scanner, as long as the sensor unit has a function similar to the above-mentioned function. Further, the sensor unit 103 may be composed of other sensors, as long as the sensor unit can perform state recognition by processing in a state recognition unit 107 which is described later.

The moving mechanism unit 104 is a component for moving vehicle 101, and is, for example, an engine, a brake, a steering mechanism, or the like. For example, the controller unit 102 calculates a target value of the moving mechanism unit 104 (a target value of an engine or a brake), and controls the moving mechanism unit 104 based on the target value.

The communication unit 105 has a function for acquiring traffic regulation data 115 and map data 116 from an external server. Further, the data storage unit 106 stores the traffic regulation data 115 and the map data 116. Assume herein that the data storage unit 106 is a hard disk drive. It is assumed in this example that the communication unit 105 acquires the traffic regulation data 115 and the map data 116 which are recorded in the data storage unit 106. However, instead of providing the communication unit 105, a configuration may be employed in which all the traffic regulation data 115 and map data 116 are recorded in the data storage unit 106 in advance.

In this case, the traffic regulation data 115 is information about traffic regulations to be observed on a road serving as an object. As the traffic regulation data 115, various pieces of information, such as a speed limit, no-entry to an opposite lane, one-way, right turn/left turn prohibition, temporary stop, are assumed. The following example is described assuming that a regulation of no-entry from a right-turn lane to another lane in an intersection is made into data.

Further, the map data 116 is information about a path for a vehicle (a path along which a vehicle is assumed to move). In this example, the map data 116 is information including path information, path shape information, and path attribute information, which are associated with each other.

Note that in this example, the map data 116 and the traffic regulation data 115 are described as separate data, but are not limited to this. For example, the map data 116 may include information about a speed limit as road marking. Accordingly, the map data 116 and the traffic regulation data 115 may be implemented as one integrated data structure, or may be implemented in such a format that the data are partially superimposed.

In this example, the path information of the map data 116 is represented by a graph structure including road link information corresponding to a center line of each lane of a roadway and intersection information (node information) corresponding to an end point (intersection) in a section of the roadway. Note that the map data 116 is not limited to such a graph structure, but instead may be represented by other structures.

The path shape information is data for specifying the shapes of the road links and the intersection. For example, the path shape information can specify the width and outline shape of the road. The attribute information is various pieces of information other than the path shape information. Examples of the information include a road sign, road marking, paint for identifying each lane of the roadway, and geography. Information about the road sign and road marking include coordinate information, an outline shape, a color, and a pattern. Note that the map data 116 may include information about objects installed on or along the roadway (a traffic light, a center divider, and a footbridge), and information about the environment of the roadway (information about sidewalks around the roadway, buildings around the roadway, and the like).

The controller unit 102 includes a sensor control unit 112, a state recognition unit 107, a path planning unit 108, a traffic regulation data acquisition unit 113, a filter setting unit 109, a map data acquisition unit 110, a map buffer 114, and a control unit 111.

The sensor control unit 112 has a function for controlling the sensor unit 103 and acquiring sensor data obtained by measuring the position, posture, and circumference environment of the vehicle 101.

The state recognition unit 107 has a function for recognizing the position and posture of the vehicle and the lane along which the vehicle is traveling, based on the sensor data obtained from the sensor unit 103.

The path planning unit 108 has a function for generating path data to a destination based on the current vehicle position obtained by the state recognition unit 107, a destination that is set separately from the destination, and the map data 116.

The traffic regulation data acquisition unit 113 has a function for acquiring the traffic regulation data 115, which is obtained through the communication unit 105, from the data storage unit 106 into the controller unit 102.

The filter setting unit 109 has a function for generating data (hereinafter referred to as a filter) representing an acquisition range of the map data 116 based on the result of the recognition by the state recognition unit 107, the path data obtained by the path planning unit 108, and the traffic regulation data obtained by the traffic regulation data acquisition unit 113.

The map data acquisition unit 110 has a function for acquiring the map data 116 from the data storage unit 106, acquiring only necessary information from the map data 116 based on the filter set by the filter setting unit 109, and storing the information in the map buffer 114. Various pieces of information of the map data 116 are selected based on the filter, and the selected map data information is stored in the map buffer 114. The information stored in the map buffer 114 is used for the state recognition unit 107, the path planning unit 108, the control unit 111, and the like.

Assume now that an application for automatic operation of the vehicle 101 is executed. The path planning unit 108 generates path data based on the map data information stored in the map buffer 114, and sends the path data to the control unit 111. The control unit 111 generates control values for the moving mechanism unit 104 (target values for the engine and the brake), and controls the moving mechanism unit 104 based on these control values.

The outline of processing in each component of the controller unit 102 has been described above. Although not illustrated in FIG. 1, assume that, for example, hardware, such as a power supply and a line, and software, such as an OS and various drivers, which are necessary for the components to communicate with each other are provided.

Further, it is assumed in this case that the controller unit 102, the sensor unit 103, and the like are implemented as separate pieces of hardware. However, the hardware may be implemented in such a manner that a part or the whole of the hardware is incorporated in another piece of hardware.

Further, a part of the components other than the sensor unit 103 and the moving mechanism unit 104 may be located at remote locations, as long as the components can communicate with each other. The hardware and software constituting each component described above may be selected or omitted depending on the embodiments.

Figure 2A:
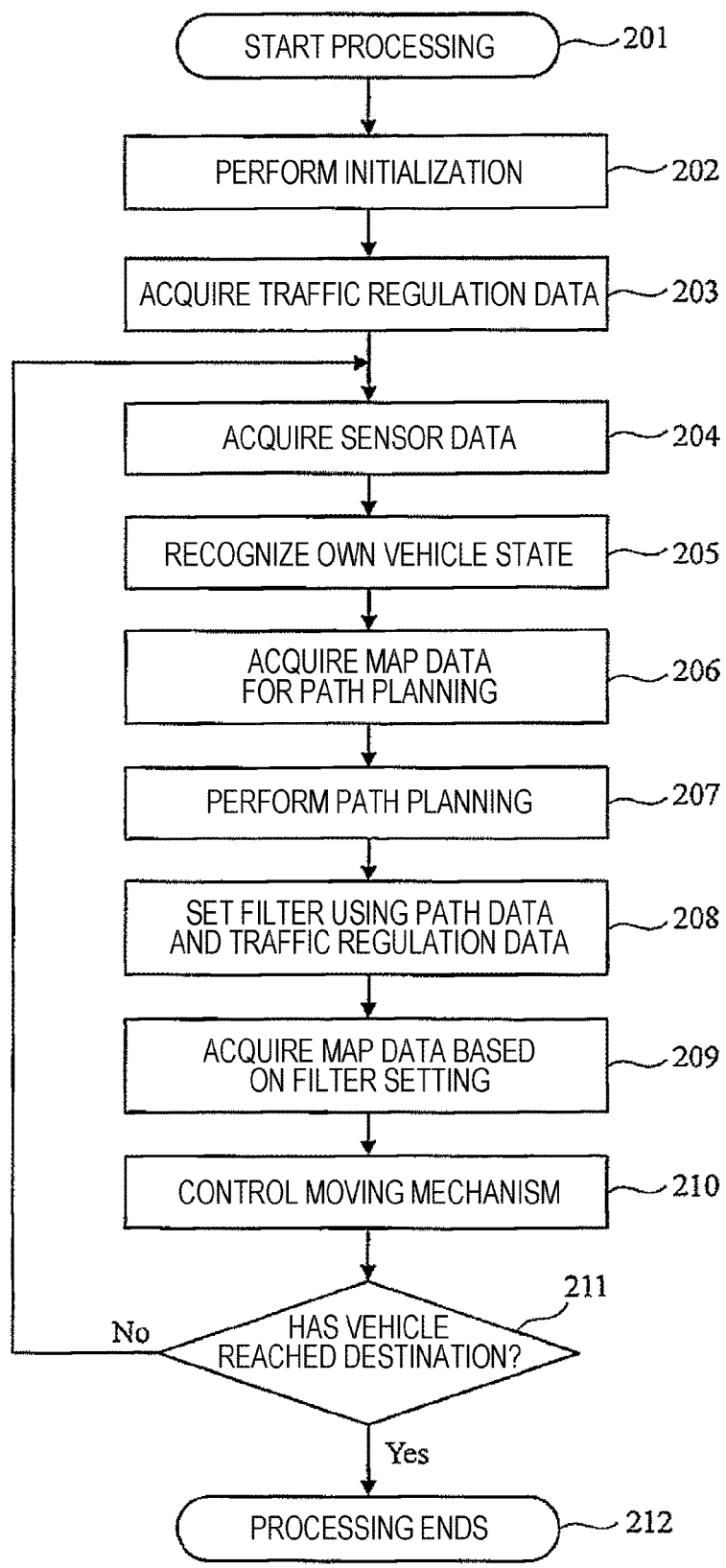
FIG. 2A is a flowchart illustrating processing of a controller unit according to the first embodiment.

Next, specific processing assuming that an application for automatic operation is executed will be described. FIG. 2A is a flowchart illustrating processing of the controller unit 102. The following description is made assuming that each functional block illustrated in FIG. 1 is set as a subject. However, since the program is executed by the processor to thereby perform predetermined processing using a memory, a communication port, and the like, the description may be made assuming that the processor is set as a subject.

When the processing is started (201), first, the controller unit 102 executes initialization processing (202). In the initialization, first, the sensor control unit 112 acquires sensor data from the sensor unit 103. The map data acquisition unit 110 acquires the peripheral map data 116 based on the position of the vehicle 101 obtained by the GPS in the sensor data, and records the map data in the map buffer 114. Based on the sensor data obtained so far and the map data 116, the state recognition unit 107 performs state recognition processing. In this example, assume that the state recognition unit 107 recognizes the position and posture of the vehicle 101 and the lane on which the vehicle 101 is present by, for example, map matching to the map data of the position obtained by the GPS. By the above processing, the position and posture of the vehicle 101 and the lane on which vehicle 101 is present on the map can be recognized.

Next, as the initialization, the controller unit 102 acquires destination information. As a method for acquiring the information, for example, a method for acquiring a destination designated by a user in a car navigation system can be employed. The destination may be automatically set from a history of previous destinations, or destination candidates such as a sightseeing spot and a restaurant. In this case, other methods may be employed as long as the destination can be set.

Next, the traffic regulation data acquisition unit 113 acquires the traffic regulation data 115 from the data storage unit 106 (203). Next, the sensor control unit 112 acquires the sensor data from the sensor unit 103 (204). Further, based on the sensor data, the state recognition unit 107 recognizes the position and posture of the vehicle 101 and the lane along which the vehicle is traveling (205).

Next, the map data acquisition unit 110 acquires, from the data storage unit 106, map data for path planning based on the current position recognized by the state recognition unit 107 (206). The map data for path planning described herein includes only data on road link information and intersection information (coordinates of the road links and the intersection, etc.) and connection relations between these pieces of information. Specifically, it is assumed that the map data for path planning does not include detailed data such as the shape information and the attribute information mentioned above, and minimum required data for path planning is used.

Next, the path planning unit 108 plans a path from the current position to the destination by using the map data acquired for path planning (207). In this case, in a graph structure in which each road link is considered to be an arc and a section where road links are connected to each other is considered to be a node, arc distance calculation and shortest path search based on the arc distance calculation are performed. The path planning unit 108 outputs, as path data, data about road links obtained by path search and an order of following the road links.

Next, the filter setting unit 109 sets a filter based on the path data obtained so far and the traffic regulation data 115 (208). The filter represents data indicating the acquisition range of the map data 116. More specifically, the filter represents flag data indicating whether or not to acquire data (path information, shape information, attribute information, etc.) included in the map data 116, for each piece of data.

Next, the map data acquisition unit 110 acquires only necessary information from the map data 116 based on the filter set by the filter setting unit 109 (209). The map data acquisition unit 110 stores the acquired map data in the map buffer 114.

Next, the control unit 111 generates the target values for the engine and the brake based on the map data obtained so far (information stored in the map buffer 114) and the path data, and controls the moving mechanism unit 104 based on these target values (210). For example, the control unit 111 calculates a curvature of a curve by using the map data (information stored in the map buffer 114), and performs control, such as braking, until a speed at which the vehicle can travel safely is reached.

Next, the control unit 111 calculates a distance between current position and the destination, and determines whether or not the vehicle has arrived at the destination (211). When the distance is larger than a threshold, it is determined that the vehicle has not arrived yet, and the series of processing is repeated. When it is determined that the vehicle has arrived, the automatic operation processing herein assumed ends (212).

Figure 2B:
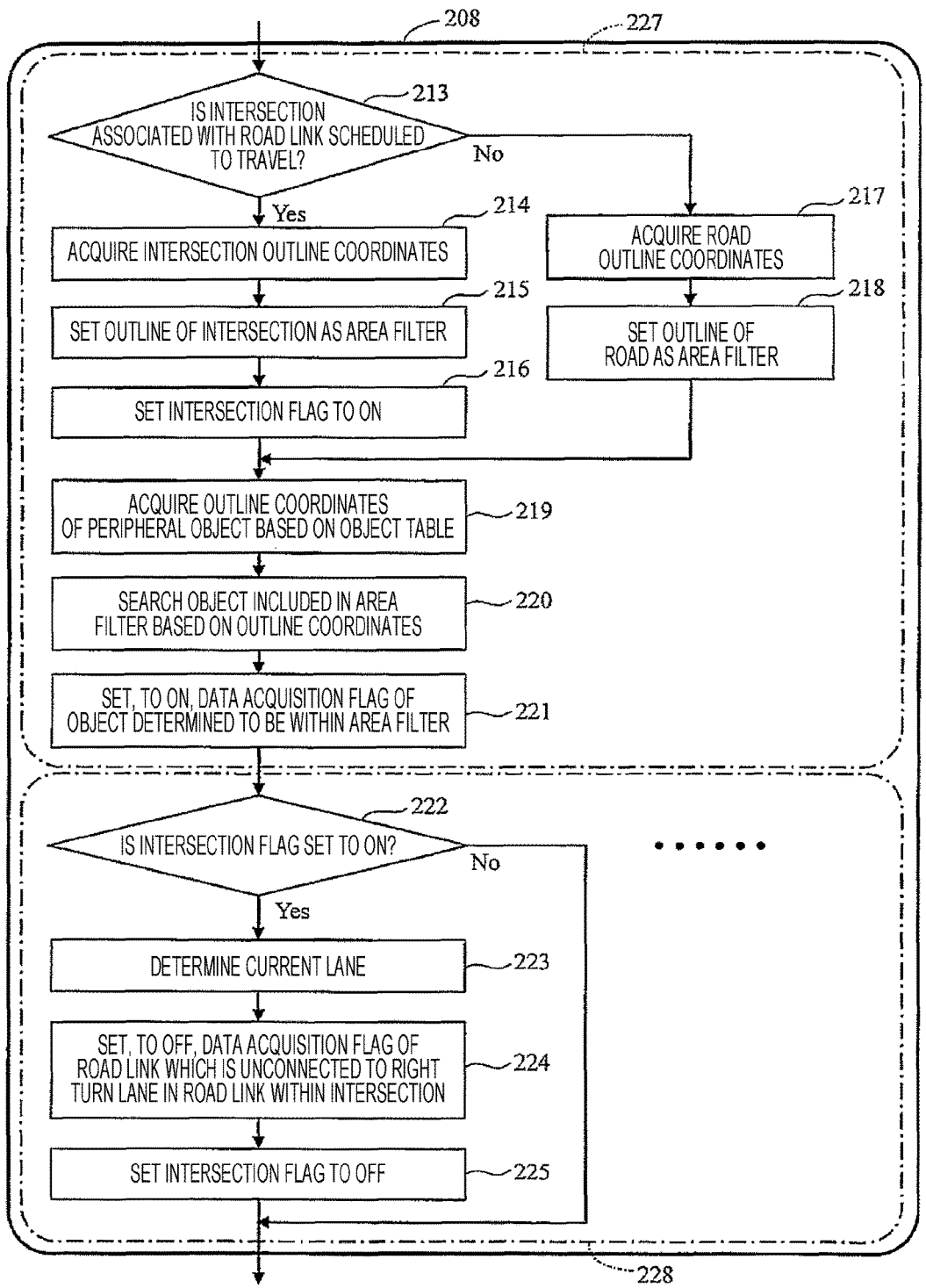
FIG. 2B is a flowchart illustrating filter setting processing of the controller unit according to the first embodiment.

FIG. 2B is a flowchart illustrating filter setting processing of the controller unit 102, as a detailed flowchart of step 208 of FIG. 2A.

The filter setting processing is roughly divided into area filter setting processing (227) and rule filter setting processing (228). The area filter is a filter representing a range when the vehicle operates according to the path data. The area filter is set based on the coordinates of the road links constituting the path and the interconnection connected to the road links, and when a road sign and the like are physically present in a predetermined range, the filter is set in such a manner that the attribute information corresponding to the road sign and the like is acquired from the map data 116. Further, a rule filter is a filter representing an operation range of the vehicle 101 in accordance with the traffic regulation data 115. Specifically, the rule filter is set based on the predetermined traffic regulation data 115, and is set in such a manner that information about a necessary range of the operation of the vehicle in accordance with traffic regulations is acquired from the map data 116.

Figure 3:
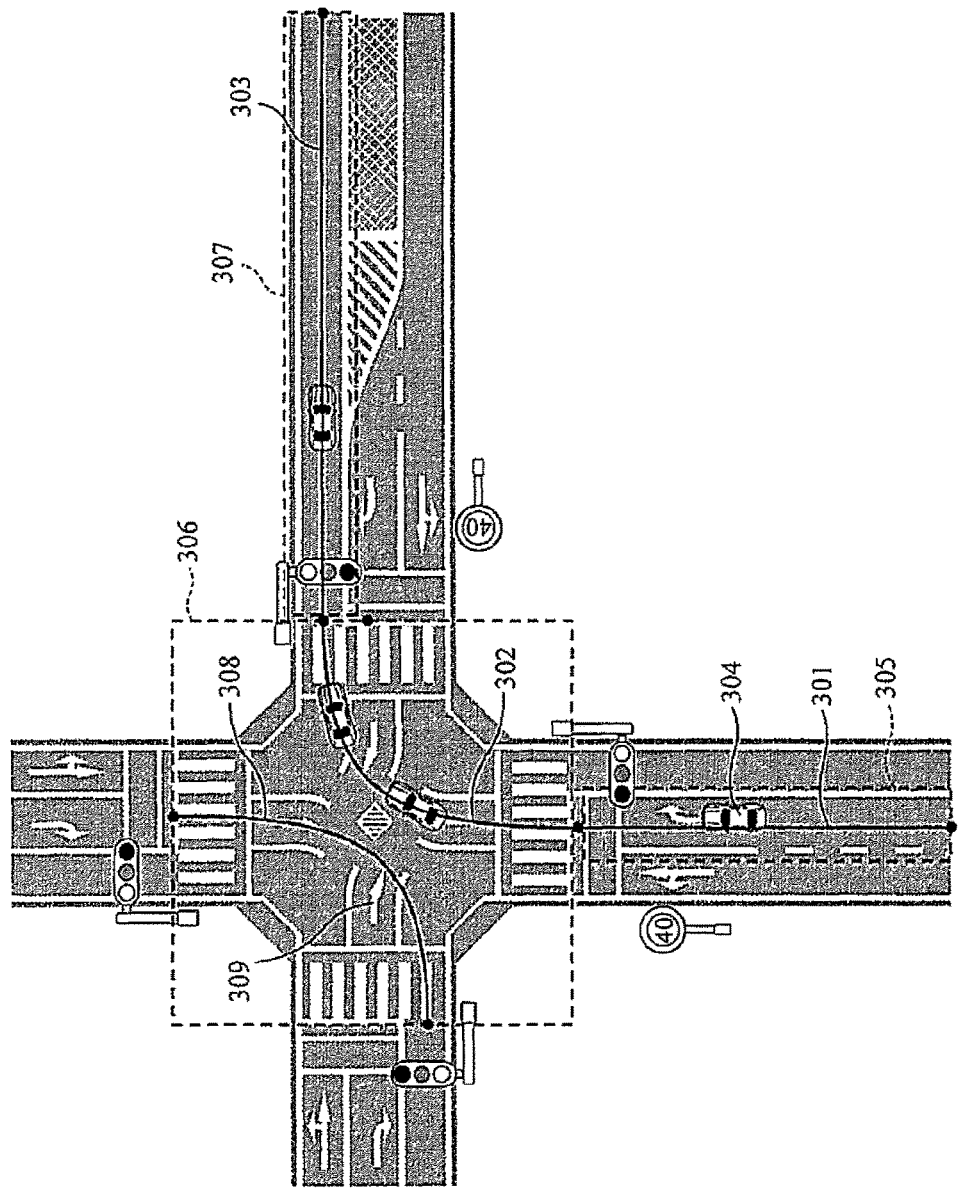
FIG. 3 illustrates a certain intersection and a plurality of road links at the intersection.

FIG. 3 illustrates a certain intersection and a plurality of road links connected to the intersection. Assume herein that a vehicle 304, which has traveled straight upward from the lower side of FIG. 3, turns right at the intersection.

Figure 4A:
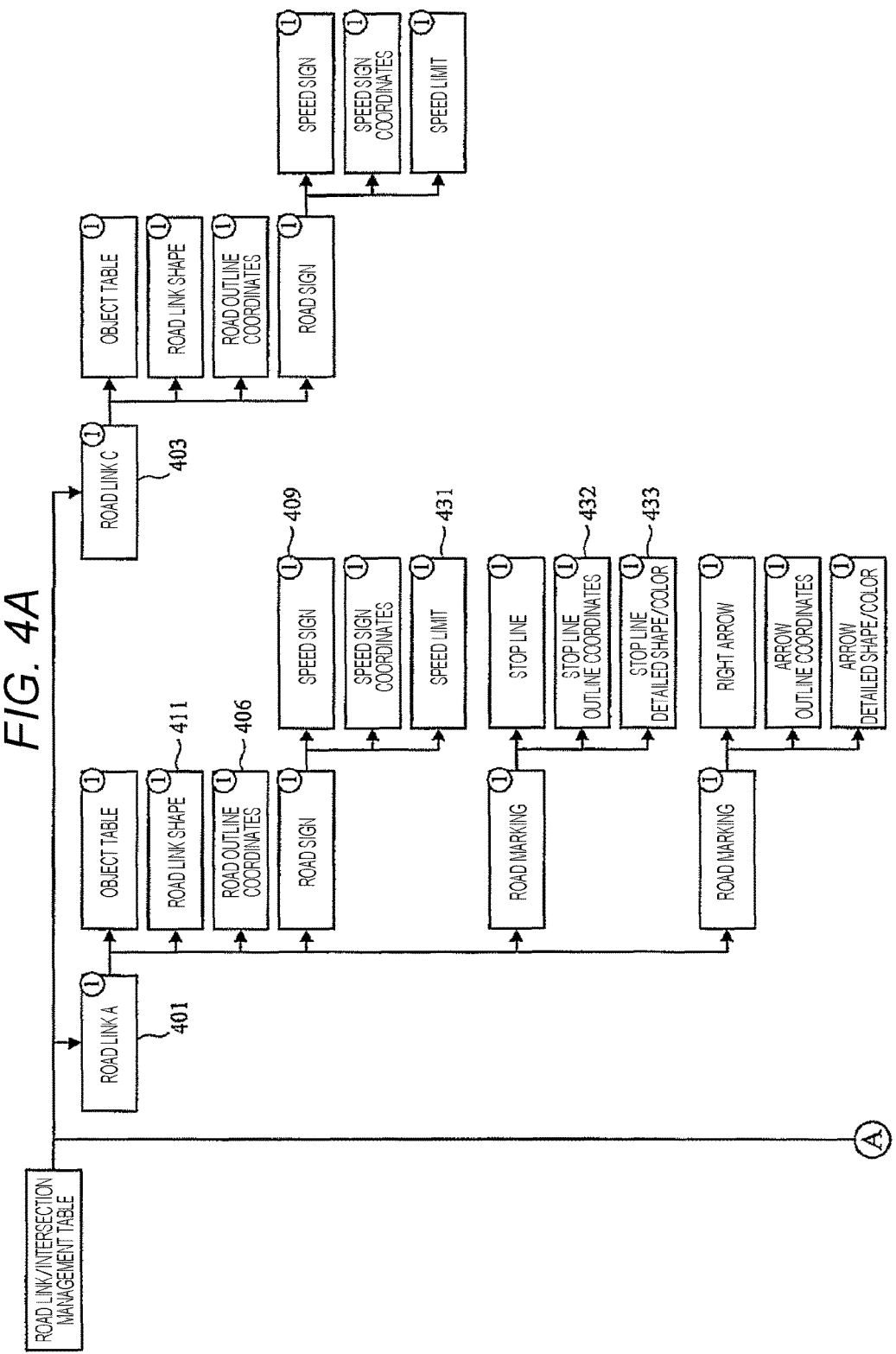
FIG. 4A is an example of a structure of map data representing the content of FIG. 3.
Figure 4B:
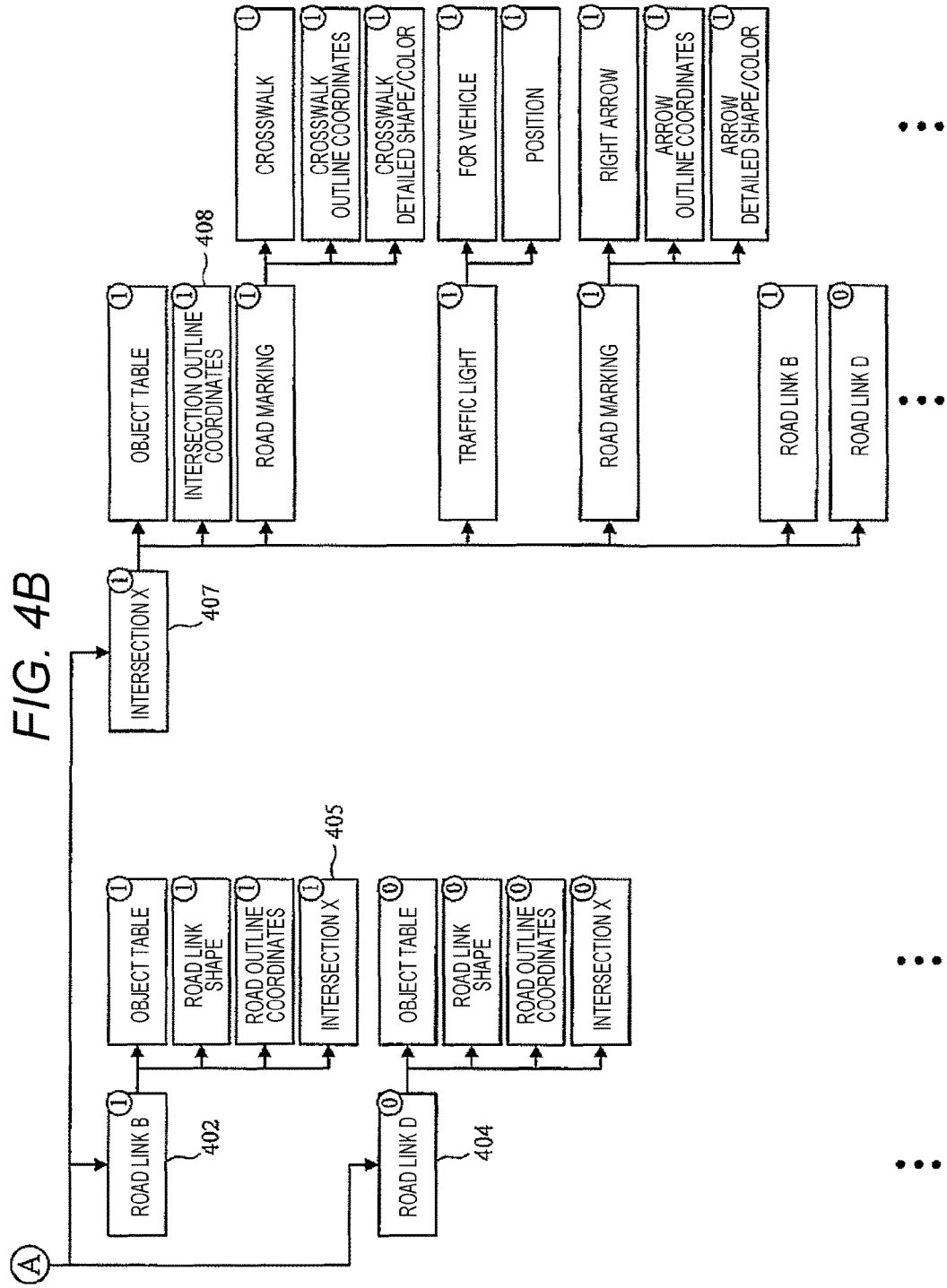
FIG. 4B is a diagram illustrating an example of the structure of the map data representing the content of FIG. 3 and is continued from FIG. 4A.

FIGS. 4A and 4B each illustrate an example of the structure of the map data 116 representing the content of FIG. 3. FIGS. 4A and 4B briefly illustrate a part of the map data corresponding to FIG. 3, for ease of explanation. In FIGS. 4A and 4B, the map data 116 is implemented as a "road link/intersection management table". The structure of the map data 116 is not limited to this format. Note that illustration of a symbol "A" in FIG. 4A follows the symbol "A" in FIG. 4B.

In FIGS. 4A and 4B, the "road link shape" corresponds to, for example, the road link information corresponding to the center line of each lane of a roadway. Further, the "road outline coordinate" corresponds to the path shape information. The "road sign", "road marking", and the like correspond to the path attribute information.

Referring to FIG. 3, the vehicle 304 moves, according to the path data, from a road link 301 to a road link 303 through a road link 302 for turning right in the intersection. The road link 301 corresponds to a road link A (401) illustrated in FIG. 4A. The road link 302 corresponds to a road link B (402) illustrated in FIG. 4B. Further, the road link 303 corresponds to a road link C (403) illustrated in FIG. 4A. Furthermore, a road link 308 corresponds to a road link D (404) illustrated in FIG. 4B. Note that in this case, not all the roadmap elements of FIG. 3, such as road marking, are illustrated in FIGS. 4A and 4B, and some of the elements are omitted. Further, the structure of the map data 116 is not limited to the structure illustrated in FIGS. 4A and 4B, but instead may be a structure in which data, such as road marking, is present in the same layer as that for road links.

Based on the above premise, in the area filter setting processing (227), first, the filter setting unit 109 determines whether or not the intersection is associated with road links constituting a path along which the vehicle is planned to move (213). The term "associated" refers to a case where intersection data can be referred to from road link data, for example, like intersection data 405 included in data of the road link B (402) illustrated in FIG. 4B (assuming herein that a substance 407 of intersection data can be acquired from the data 405). This indicates a case where a road link, such as the road link 302 illustrated in FIG. 3, is present in the intersection. As described above, the filter setting unit 109 checks whether or not there is intersection data for road links.

When the intersection data is not included in the road link information, it is determined that the road link does not pass through the intersection. In this case, the filter setting unit 109 acquires road outline coordinates of the road link (217). For example, for the road link 301, data of road outline coordinates 406 (FIG. 4A) is acquired. The road outline coordinates are vertex coordinates of a polygon provided so as to include the road link. The filter setting unit 109 sets a region indicated by the vertex coordinates as the area filter (218). For example, for the road link 301, the area filter is set as indicated by a dotted frame 305 illustrated in FIG. 3. Similarly, since the road link 303 is not included in the intersection, the area filter is set as indicated by a dotted frame 307 illustrated in FIG. 3.

On the other hand, it is checked whether or not there is intersection data for the road link. When the intersection data is included, the road link is determined to pass through the intersection. In this case, the filter setting unit 109 acquires intersection outline coordinates of the intersection that can be referred to from the road link (214). For example, for the road link 302, data of intersection outline coordinates 408 (FIG. 4B) is acquired. The intersection outline coordinates are vertex coordinates of a polygon provided so as to include the intersection. The filter setting unit 109 sets a region indicated by the vertex coordinates as the area filter (215). For example, for the road link 302, the area filter is set as indicated by a dotted frame 306 illustrated in FIG. 3.

Note that in this case, the region serving as the area filter is determined by road outline coordinates or the intersection outline coordinates recorded in the map data 116, however, it may be determined by a method in which vertex coordinates forming the region on the spot are calculated based on the road link shape and the like (e.g., 411 in FIG. 4A).

Note that in the following example, processing is performed based on traffic regulations in the intersection, and thus the filter setting unit 109 turns on an intersection flag (216). This intersection flag is a flag indicating that the intersection is associated with road links.

Next, the filter setting unit 109 acquires outline coordinates of an object based on an object table corresponding to a road link (219). The object herein described refers to map data particularly having outline coordinates in the map data 116. The object is not limited to the information associated with the intersection or the road link. As the object herein described, all objects including an outer shape (outline coordinates) in the map data, such as some installations or buildings located around the road link or the intersection, may be used. The object table refers to data held for each intersection or each road link, and represents a relationship between the object and the intersection or the road link. For example, the object table for road links records the object associated with the road link and the connection relation between the road link and each object. By referring to the object table, it can be determined what kind of objects (road marking, a road sign, and the like) are present in the road link.

The filter setting unit 109 acquires the outline coordinates of the object associated with the road link based on the object table. For example, in the case of the road link A (401) illustrated in FIG. 4A, outline coordinates 432 of road marking, which is the object, and the like are acquired.

Next, the filter setting unit 109 executes search of objects present in the range of the area filter from outline coordinates for each object and vertex coordinates for the area filter (220). In this case, the filter setting unit 109 creates a list of the objects present in the range of the area filter.

Next, the filter setting unit 109 sets a data acquisition flag to ON for each object determined to be within the area filter (221). The data acquisition flag refers to data added for each piece of data in the map data as denoted by 409 in FIG. 4A. The data acquisition flag "1" is defined as ON and the data acquisition flag "0" is defined as OFF. When the data acquisition flag 409 is "1", the object is acquired as the map data, and when the data acquisition flag is "0", the object is not acquired as the map data. As described above, the acquisition range of the map data is set based on the path data.

Next, in the rule filter processing (228), the acquisition range of the map data is set based on the traffic regulation data 115. Assume herein that the rule filter is set based on a regulation of no-entry from a right-turn lane to another lane in an intersection.

Based on the above assumption, first, the filter setting unit 109 determines whether or not the road link is present in the intersection (222). This processing is performed based on the intersection flag in step 216. When the intersection flag is OFF, the road link is not present in the intersection. Accordingly, the subsequent processing is advanced without performing the processing based on the regulation in the intersection.

On the other hand, when the intersection flag is ON, the road link is present in the intersection. Accordingly, the filter setting unit 109 performs the processing based on the regulation in the intersection. First, the filter setting unit 109 determines the lane along which the vehicle is traveling (223). The filter setting unit 109 can acquire, from the state recognition unit 107, information about the lane along which the vehicle is traveling. Assume now that as illustrated in FIG. 3, the vehicle 304 is traveling along a lane exclusive for right-turn.

In this case, the following processing is performed in view of no-entry to another lane. The filter setting unit 109 sets the data acquisition flag to OFF for road links other than the road link corresponding to the lane exclusive for right-turn and related data (224). For example, when the vehicle 304 is traveling at a position indicated in FIG. 3 and enters the lane exclusive for right-turn, i.e., when there is no other option but to turn right in the next intersection, the data acquisition flag of the map data of the road link 308 that is not connected to the road link 302 (i.e., the vehicle cannot enter the road link 302) is set to OFF, even within the range of the area filter 306. That is, the data acquisition flag of the road link D (404) illustrated in FIG. 4B is set to OFF. Thus, in the area filter 306, data on the road link 308 into which the vehicle cannot enter from the road link 302 and road marking and the like associated with the road link 308 are not acquired. Lastly, the filter setting unit 109 sets the intersection flag to OFF (225).

In this case, the step of determining the current lane (223) is carried out. However, this step may be changed or omitted as appropriate. For example, instead of determining the current lane, path data may be compared and the data acquisition flag of the map data of the road link 308 that is not present on the path data may be set to OFF.

With the above configuration, the map data acquisition unit 110 acquires only necessary information (i.e., information indicating the data acquisition flag set to ON) from the map data 116 based on the area filter and the rule filter set by the filter setting unit 109. Consequently, the amount of map data actually acquired in the map buffer 114 of the controller unit 102 is reduced with respect to the entire map data 116.

Note that the above embodiments illustrate an example in which the rule filter is set by taking the regulation of no-entry from a right-turn lane to another lane in an intersection as an example. However, even when other regulations are used, the embodiments can be carried out in the same manner as described above. That is, the rule filter setting processing may be implemented in accordance with regulations to be applied. For example, in the case of no-entry to an opposite lane, one-way, right turn/left turn prohibition, and the like, the data acquisition flag of information related to the road link into which the vehicle cannot enter from the current lane may be set to OFF.

Further, in the case of a speed limit regulation, for example, the data acquisition flag of the speed limit 431 in FIG. 4A may be set to ON to acquire information. Based on the information, the control unit 111 may control the moving mechanism unit 104 to adjust the speed of the vehicle 101.

In the case of a stop line, for example, the data acquisition flag of each of the outline coordinates 432 and detailed shape/color 433 may be set to ON. Based on these pieces of information, the control unit 111 can control the moving mechanism unit 104 to stop the vehicle 304 by automatic operation at the position corresponding to the stop line. At this time, the control unit 111 may stop the vehicle 304 at the position corresponding to the stop line based on the sensor data from the sensor unit 103 and the current position from the state recognition unit 107.

Further, in this case, the area filter and the rule filter are sequentially set to thereby reduce the amount of map data to be acquired. However, only one of the area filter and the rule filter may be carried out, or these filters may be carried out by changing the order of the filters.

Figure 5:
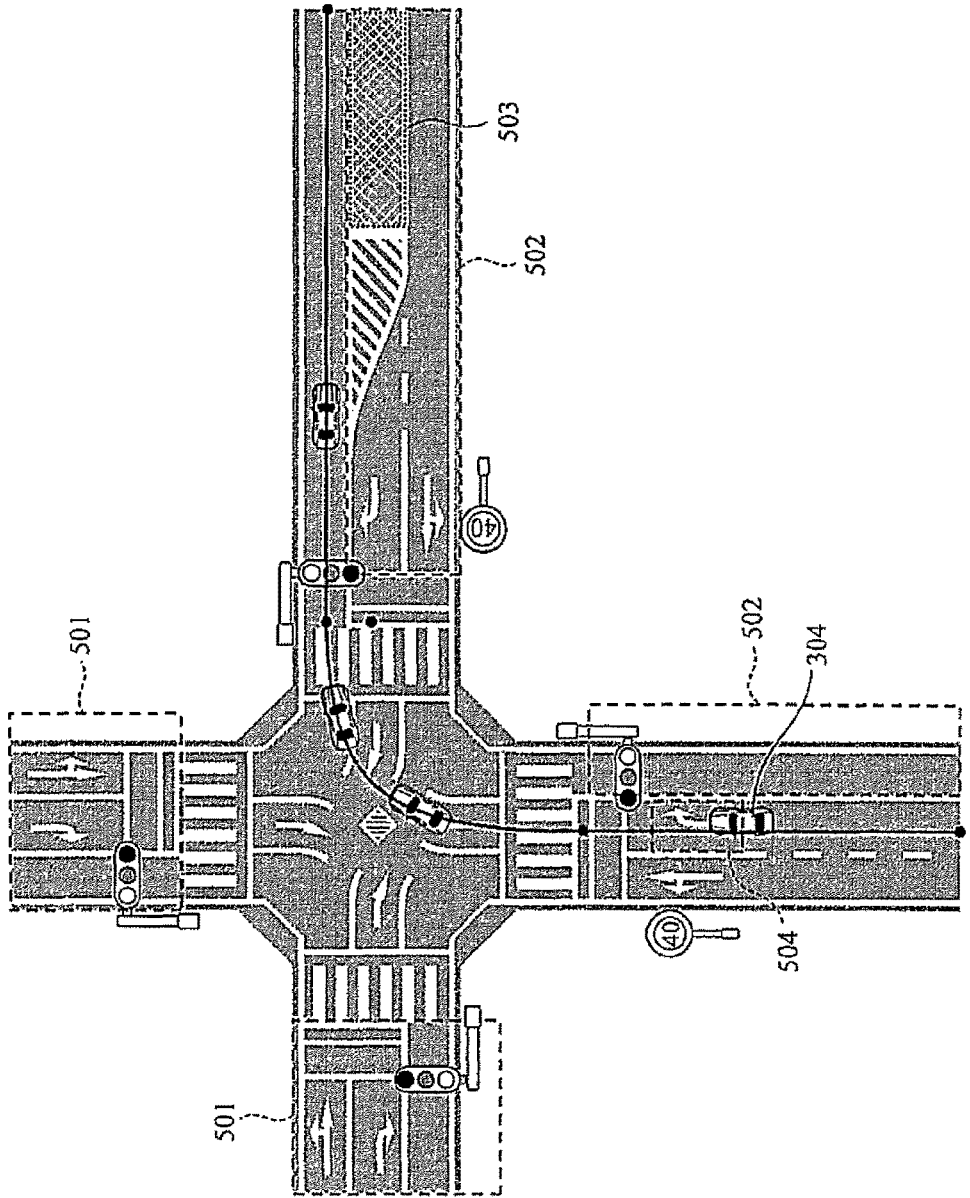
FIG. 5 is a diagram for explaining another example of the filter setting processing.

FIG. 5 is a diagram for explaining another example of the filter setting processing. In the above example, information about the road link related to the path data based on which the vehicle is planned to travel is acquired based on the path data and the traffic regulation data 115. Like FIG. 3, FIG. 5 is a diagram assuming a case where the vehicle 304 turns right at the intersection. In this case, a part indicated by a dotted frame 501 corresponds to the road link that is not consistent with the path data on the vehicle 304, and thus data acquisition is not performed.

Further, in the above example, a part indicated by a dotted frame 502 illustrated in FIG. 5 represents an opposite lane with respect to the traveling direction of the vehicle 304, and thus data acquisition is not performed based on the path data and the traffic regulation data 115. However, for example, in the case of an application for emergency avoidance in the automatic operation, the filter setting unit 109 may set a filter to a part or the whole of the dotted frame 502 and acquire map data.

For example, it is assumed that, when a parked vehicle, an obstacle, or the like is present in the road link on the path data, the vehicle 304 goes around the vehicle, the obstacle, or the like so as to avoid it, the vehicle 304 runs slightly over the adjacent lane (the opposite lane indicated by the dotted frame 502). Accordingly, when it is assumed that map data for the emergency avoidance application is used, the filter setting unit 109 sets a filter to the whole or a part of the dotted frame 502, thereby enabling the emergency avoidance application to determine that a lane to which the vehicle can move is present adjacent to the lane along which the vehicle is traveling, and enabling the vehicle 304 to perform a circumvention operation. Accordingly, the filter setting unit 109 can set not only the strict range consistent with the path data depending on the type of the application or the status of the vehicle, but also an operable range when the vehicle operates in accordance with the path data as a filter. In other words, information about a lane (road link) which is not associated with the path data based on which the vehicle is planned to travel may be acquired depending on the type of the application or the status of the vehicle.

In another example, a filter may be set in consideration of a part in which the vehicle cannot travel. A dotted frame 503 illustrated in FIG. 5 represents a center divider, and the vehicle 304 cannot travel in the dotted frame. When it is assumed that the above-mentioned emergency avoidance application is used, the filter setting unit 109 may set a filter to a part other than the dotted frame 503 and acquire data. This enables the emergency avoidance application to determine that a region in which the vehicle cannot travel is present adjacent to the lane along which the vehicle is traveling. When a parked vehicle or the like is present in the region, the vehicle 304 can be controlled to, for example, stop. Note that the filter setting unit 109 may set a filter so as not to acquire detailed information (e.g., attribute information) in this region based on the assumption that the part indicated by the dotted frame 503 is the region in which the vehicle cannot travel.

Further, in another example, the filter setting unit 109 may control the acquisition of the attribute information in the map data depending on the type of the application or the status of the vehicle. Road marking on the road surface is present in a dotted frame 504 illustrated in FIG. 5. Whether or not to acquire detailed information about the road marking may be changed depending on the type of the application or the status of the vehicle.

Figure 6:
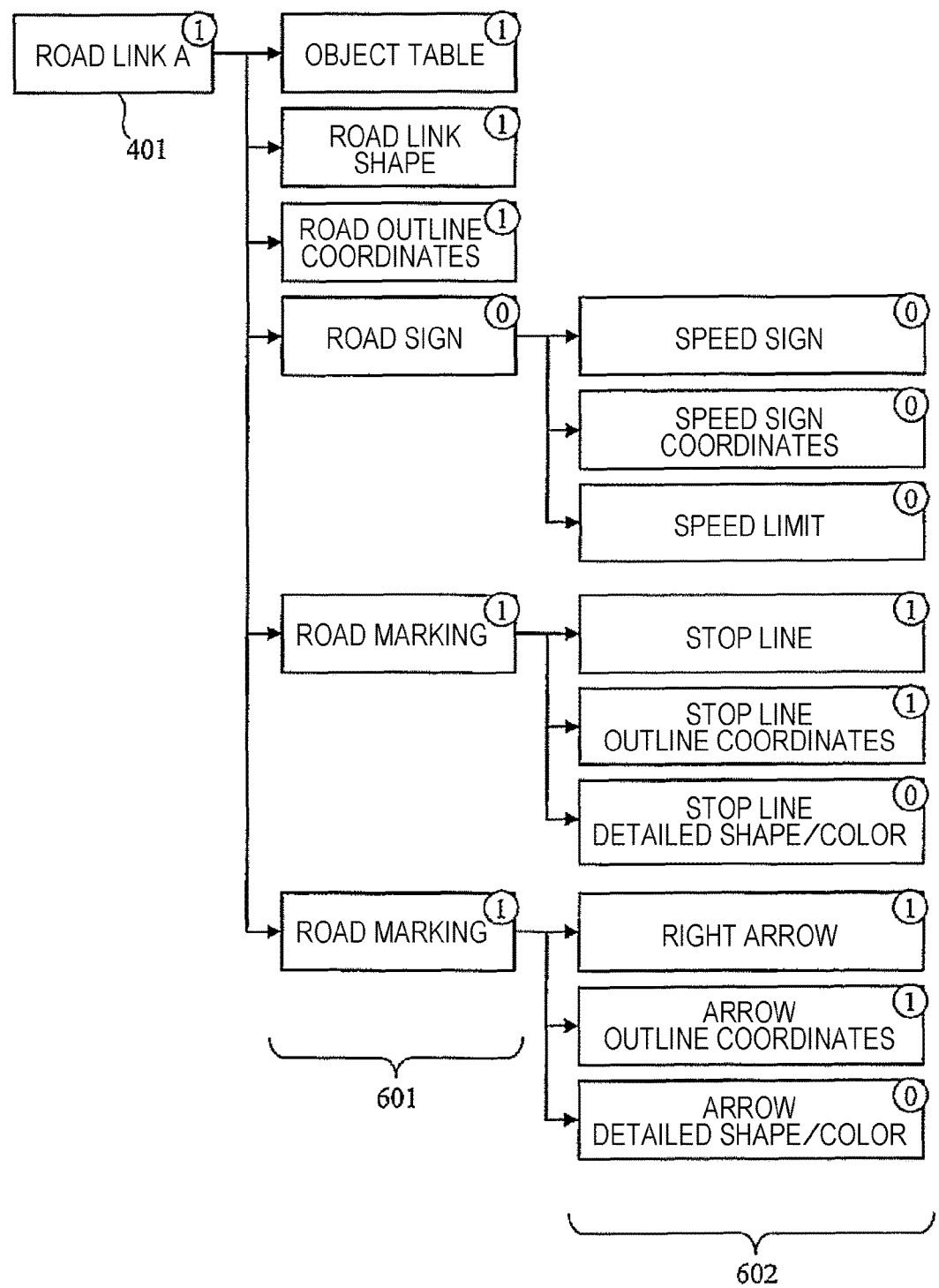
FIG. 6 is a diagram illustrating a part of FIG. 4A and explaining another example of control for a map data acquisition range.

FIG. 6 is a diagram illustrating the road link A (401) of FIG. 4A and explaining another example of control for a map data acquisition range. For example, in the case of an application for vehicle position estimation, it is important to comprehend a positional relationship between the vehicle and an object (road marking or the like) on a road link, and it can be assumed that the speed limit information is not required. Accordingly, as illustrated in FIG. 6, in the road link A (401) associated with the path data based on which the vehicle travels, the filter setting unit 109 may control the range in which the data acquisition flag is set to ON depending on the type of the application. Note that FIG. 6 illustrates an example in which the data acquisition flag for the speed limit is OFF, but instead the data acquisition flag may be ON. For example, in a status where the vehicle is traveling on an expressway, i.e., in a status where the vehicle is simply operated to travel along the current lane, only the speed limit information may be acquired from the map data and the automatic operation application may adjust the speed.

In the case of this example, as illustrated in FIG. 6, the map data has a structure in which first layer data 601 and second layer data 602 are formed into layers. Accordingly, the filter setting unit 109 may control the range of the filter in a plurality of layers or in the same layer in the hierarchical data structure. For example, the filter setting unit 109 may control the acquisition of information from which layers in the road link A (401), and may control the acquisition of which information in the same layer. For example, depending on the type of the application or the status of the vehicle, it is assumed that detailed information about an object (road marking or the like) is not required. In this case, as illustrated in FIG. 6, in the information in the same layer associated with the road marking, the data acquisition flag for "detailed shape/color" is set to OFF.

According to the configuration described above, the data acquisition range is set with respect to the entire map data based on the path data and the traffic regulation data, thereby making it possible to narrow down the range of the map data acquired by the controller unit 102. Accordingly, a load associated with the acquisition of the map data by a movable body, such as the controller unit 102 and the vehicle 101, can be reduced.

Further, the filter representing the acquisition range of the map data is set depending on the status of a certain object (in this case, a vehicle) or the type of the application, thereby making it possible to narrow down the range of information acquired from the map information. For example, the filter can be set from the information about, for example, the lane along which the vehicle 101 is currently traveling. In the case of the application for vehicle position estimation, information (outline coordinates etc.) about road signs and road marking necessary for position estimation can be acquired from the map data, and high-precision vehicle position estimation can be performed in cooperation with the sensor unit 103. Further, in the case of the application for automatic operation, detailed information associated with driving can be acquired from the map data, such as a speed limit, a stop line, a curvature of a curve, and a difference in height of a slope, and the control unit 111 can control the moving mechanism unit 104.

Further, since the capacity of the map data is reduced, when the controller unit acquires map data, processing can be performed using a lower-speed device or a controller including only a network. Furthermore, the controller unit for the vehicle can be implemented using a lower-speed vehicle or a network, which leads to a reduction in cost.

Second Embodiment

Figure 7:
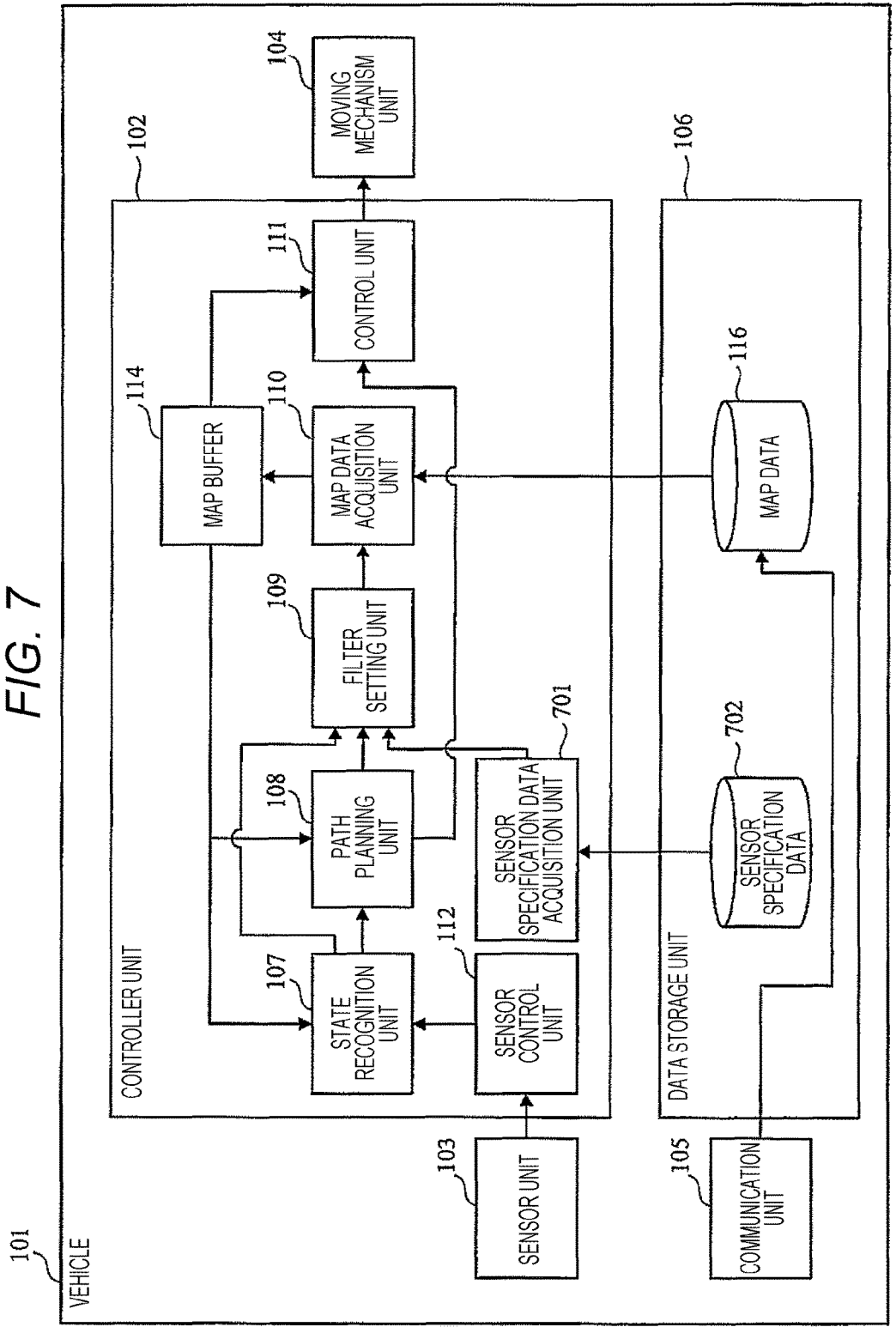
FIG. 7 is a schematic configuration diagram illustrating a vehicle according to a second embodiment.

FIG. 7 illustrates a configuration of a vehicle according to a second embodiment. Components in FIG. 7 that are the same as those in FIG. 1 are denoted by the same reference numerals and descriptions thereof are omitted.

In this embodiment, the data storage unit 106 stores sensor specification data 702. In this case, the sensor specification data is information defining a measurable range by the sensor unit 103. For example, the sensor specification data indicate a view angle of the sensor unit 103, a measurement distance in a depth direction that can be measured by the sensor unit 103, or the like.

Further, the controller unit 102 includes a sensor specification data acquisition unit 701. The sensor specification data acquisition unit 701 acquires the sensor specification data 702 from the data storage unit 106, and sends the sensor specification data to the filter setting unit 109.

Figure 8:
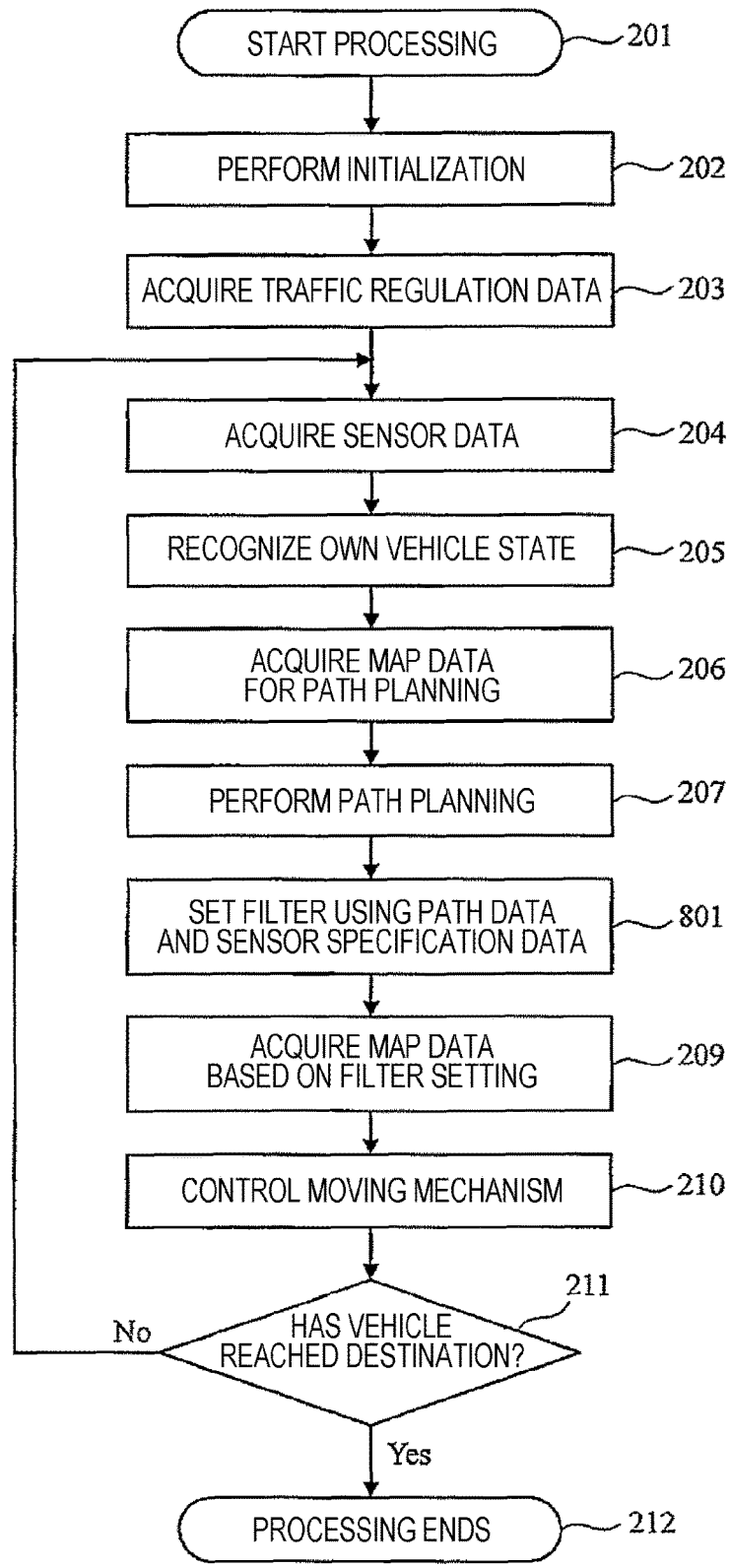
FIG. 8 is a flowchart illustrating processing a control unit according to the second embodiment.

FIG. 8 is a flowchart illustrating processing of the controller unit 102 according to the second embodiment. Processes in FIG. 8 that are the same as those in FIG. 2A are denoted by same reference numerals and descriptions thereof are omitted. In this case, after the path data is output in step 207 of path planning, the filter setting unit 109 sets the area filter based on the path data and the sensor specification data (801).

Figure 9:
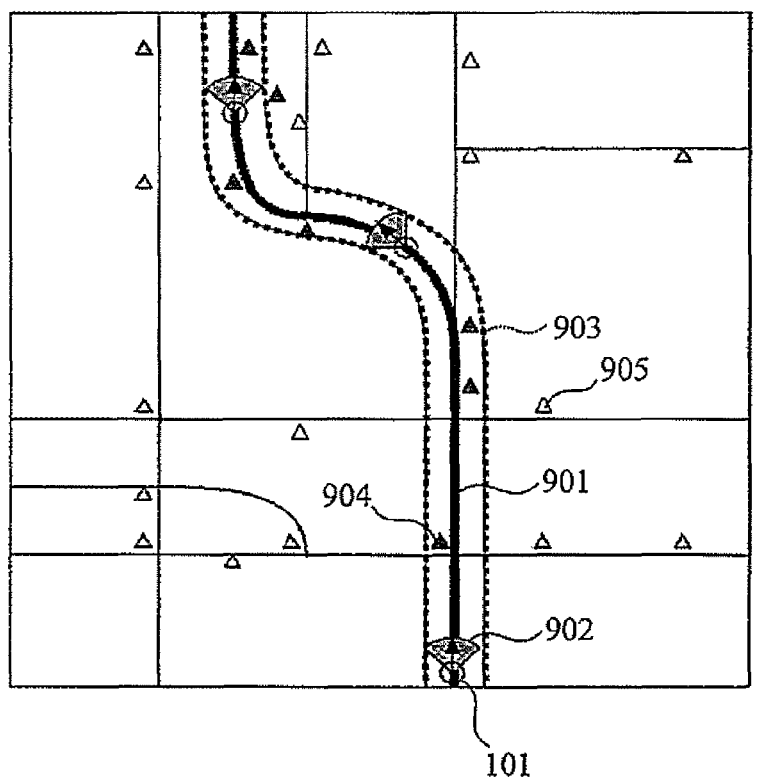
FIG. 9 is a diagram for explaining filter setting processing of the control unit according to the second embodiment.

FIG. 9 is a diagram illustrating an area filter setting. Reference numeral 901 denotes a line representing path data output in step 207 of FIG. 8. The filter setting unit 109 calculates the range measurable by the sensor unit 103 based on the sensor specification data 702 (a view angle, a measurable distance in the depth direction, etc.). A fan-shaped area 902 represents the range that is measurable by the sensor unit 103 and is calculated based on the sensor specification data 702.

When the vehicle 101 travels along the path data 901, the range measurable by the sensor unit 103 is an area surrounded by a dotted line 903. Thus, the filter setting unit 109 calculates the range measurable by the sensor unit 103 along the path, assuming that the vehicle 101 travels on the path data 901. The filter setting unit 109 sets, as the area filter, the measurable range calculated for the entire path. The map data acquisition unit 110 acquires only necessary information from the map data 116 based on the area filter set by the filter setting unit 109. Therefore, the amount of map data actually acquired in the map buffer 114 of the controller unit 102 can be reduced with respect to the entire map data 116.

For the application for recognizing a landmark in the sensor unit 103 during traveling of the vehicle 101, information of the map data 116 other than the range measurable by the sensor unit 103 is not required. Thus, for example, in the recognition of a landmark in the sensor unit 103 such as a stereo camera, only necessary information (the outline coordinates, shape, color, pattern, and the like of an object) in the map data 116 can be acquired.

Accordingly, the filter setting unit 109 may preferentially acquire information about objects in the range measurable by the sensor unit 103. Specifically, the filter setting unit 109 acquires outline coordinates of objects associated with road links on the path data 901 based on the object table. Further, the filter setting unit 109 executes search for objects in the range of the area filter from the outline coordinates of each object and the range of the area filter, and sets the data acquisition flag of the object to ON. For example, a symbol 904 in FIG. 9 is a road sign indicating a speed limit. This road sign is present in the range measurable by the sensor unit 103, and thus information is preferentially acquired.

Note that, also in this embodiment, based on the set area filter, the filter setting unit 109 may determine whether or not the object is present in the area filter, and may control the acquisition range of the information about the object (the range in which the data acquisition flag is turned on). For example, the filter setting unit 109 may control the acquisition of data in which layer for each piece of data in the map data. For the object 904 located in the area filter, information (outline coordinates, shape, color, pattern, etc.) of second layer data is acquired. For an object 905 which is located outside of the area filter, information simply indicating that there is an object (i.e., only information of first layer data) may be acquired.

The present invention is not limited to the embodiments described above and includes various modified examples. The above embodiments are detailed examples of the present invention for ease of understanding. The present invention is not limited to a case where all the components described above are included. A part of the configuration of a certain embodiment may be replaced by the configuration of another embodiment. The configuration of a certain embodiment may be added to the configuration of another embodiment. For a part of the configuration of each embodiment, additions, omissions, or substitutions of other configurations can be made.

While the embodiments of the present invention which are applied to the automatic operation have been described above, the embodiments may be applied to applications other than the automatic operation. While the map data used for the application for controlling the vehicle has been described above, the control for the acquisition range of the map data is not limited to the control for the vehicle, and can be applied to other controls. For example, the control can also be applied for an application for a terminal (a mobile terminal, a smartphone, etc.) which can load map data.

The processing of the controller unit 102 described above can also be implemented by a program code of software for implementing the functions. In this case, a storage medium recording the program code is provided to a system or a device, and a computer (or a CPU or an MPU) in the system or the device reads out the program code. In this case, the program code itself readout from the storage medium implements the functions of the embodiments described above, and the program code itself and the storage medium storing the program code constitute the present invention. As the storage medium for supplying the program code, for example, a flexible disk, a CD-ROM, a DVD-ROM, a hard disk, an optical disk, a magnet-optical disk, a CD-R, a magnetic tape, a non-volatile memory card, and a ROM are used.

The processes and techniques herein described are not essentially related to any specific devices, and can be implemented by any appropriate combinations of components. Further, various types of general-purpose devices can be used. To execute the steps in the method described above, it may be useful to construct a dedicated device. In other words, a part or the whole of the controller unit 102 described above may be implemented by hardware using an electronic component such as an integrated circuit.

Further, in the above embodiments, control lines and information lines which are considered to be necessary for explanation are illustrated, but not all the control lines and information lines of a product are illustrated. All components may be connected to each other.

REFERENCE SIGNS LIST

101 vehicle
102 controller unit
103 sensor unit
104 moving mechanism unit
105 communication unit
106 data storage unit
107 state recognition unit
108 path planning unit
109 filter setting unit
110 map data acquisition unit
111 control unit
112 sensor control unit
113 traffic regulation data acquisition unit
114 map buffer
115 traffic regulation data
116 map data
701 sensor specification data acquisition unit
702 sensor specification data

The invention claimed is:

1. An information processing apparatus for reducing processing load during a reading of map information, comprising:
   a memory; and
   a processor that is communicatively coupled to the memory, wherein the processor;
   generates path data to a destination of a certain object;
   sets a filter representing an acquisition range to map data based on the path data and a specification data;
   acquires, from the map data, data in the range set by the filter; and
   when the object proceeds on the path data, calculates a range measurable from the specification data, and sets an area filter by calculating the measurable range along a path, whereby processing is reduced.

2. The information processing apparatus according to claim 1, wherein the filter includes an area filter representing a range when the object operates according to the path data.

3. The information processing apparatus according to claim 2, wherein the processor sets the filter so as to acquire data on an object in a range of the area filter in the map data.

4. The information processing apparatus according to claim 1, wherein the filter includes a rule filter representing a range of an operation of the object according to traffic regulation data.

5. The information processing apparatus according to claim 4, wherein the processor sets the rule filter based on a current position of the object and the traffic regulation data.

6. The information processing apparatus according to claim 1, wherein the processor controls a range of the filter according to a type of an application or a status of the object.

7. The information processing apparatus according to claim 6, wherein
   the map data has a data structure including a plurality of layers, and
   the processor controls a range of the filter in the plurality of layers or in the same layer according to the type of the application or the status of the object.

8. An information processing apparatus that receives sensor data from a sensor, the information processing apparatus comprising:
   a memory; and
   a processor communicatively coupled with the memory and the sensor, wherein the processor;
   generates path data to a destination of a certain object;
   sets a filter representing an acquisition range to map data based on the path data and specification data of the sensor;
   acquires, from the map data, data in the range set by the filter; and
   when the object proceeds on the path data, calculates a range measurable from the specification data, and sets an area filter by calculating the measurable range along a path, whereby processing is reduced.

9. The information processing apparatus according to claim 8, wherein the processor sets the filter so as to acquire data on an object in a range of the area filter in the map data.

10. The information processing apparatus according to claim 8, wherein the processor controls an acquisition range of data on an object depending on whether or not the object is located in the area filter.

\* \* \* \* \*